(12) United States Patent
Park

(10) Patent No.: US 9,372,554 B2
(45) Date of Patent: Jun. 21, 2016

(54) ELECTRONIC PEN, ELECTRONIC PEN CONNECTION STRUCTURE CONNECTING TO THE ELECTRONIC PEN, AND PORTABLE DEVICE HAVING THE ELECTRONIC PEN CONNECTION STRUCTURE

(71) Applicant: Samsung Electronics Co., Ltd., Suwon-si, Gyeonggi-do (KR)

(72) Inventor: Hyungjin Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 14/162,003

(22) Filed: Jan. 23, 2014

(65) Prior Publication Data

US 2014/0240297 A1 Aug. 28, 2014

(30) Foreign Application Priority Data

Feb. 28, 2013 (KR) .................. 10-2013-0021752

(51) Int. Cl.
*G06F 3/0354* (2013.01)
*G06F 3/038* (2013.01)

(52) U.S. Cl.
CPC .......... *G06F 3/03545* (2013.01); *G06F 3/0383* (2013.01)

(58) Field of Classification Search
CPC .... G06F 3/041; G06K 7/10544; G06K 9/222; G06K 3/03542; H04M 1/0285
USPC .................. 345/156–173; 178/18.01–18.03
See application file for complete search history.

(56) References Cited

U.S. PATENT DOCUMENTS

| 6,361,232 | B1 * | 3/2002 | Nagaoka | G06F 3/03545 |
| | | | | 401/258 |
| D563,469 | S * | 3/2008 | Qiu et al. | D19/44 |
| 2003/0053840 | A1 * | 3/2003 | Lapstun et al. | 401/45 |
| 2007/0280772 | A1 * | 12/2007 | Mika | B43K 7/005 |
| | | | | 401/33 |
| 2009/0115745 | A1 * | 5/2009 | Chuang et al. | 345/179 |
| 2009/0135149 | A1 * | 5/2009 | Taniuchi | 345/173 |
| 2010/0224423 | A1 * | 9/2010 | Li | G06F 3/03545 |
| | | | | 178/18.01 |
| 2011/0037699 | A1 * | 2/2011 | Kim | 345/166 |
| 2011/0038659 | A1 * | 2/2011 | Andochick | B43K 5/005 |
| | | | | 401/48 |
| 2011/0148757 | A1 * | 6/2011 | Lathrop et al. | 345/157 |
| 2011/0164000 | A1 * | 7/2011 | Pance | G06F 3/03545 |
| | | | | 345/179 |
| 2012/0182271 | A1 * | 7/2012 | Wu | G06F 3/03545 |
| | | | | 345/179 |
| 2014/0125606 | A1 * | 5/2014 | Namkung | G06F 1/1656 |
| | | | | 345/173 |
| 2014/0333589 | A1 * | 11/2014 | Wang | G06F 3/03545 |
| | | | | 345/179 |

* cited by examiner

*Primary Examiner* — Grant Sitta
(74) *Attorney, Agent, or Firm* — Jefferson IP Law, LLP

(57) ABSTRACT

An electronic pen, an electronic pen connection structure connecting to the electronic pen, and a portable device having the electronic pen connection structure are provided. An electronic pen that controls an on/off operation of a switch provided on an electronic pen connection structure of a portable device using at least one groove provided on the electronic pen, the electronic pen connection structure connecting to the electronic pen, and the portable device having the electronic pen connection structure are provided. The electronic pen connected to a portable device by the electronic pen connection structure formed on the portable device includes a pen point portion that generates a user input on the portable device, and a penholder portion that is connected to the pen point portion and has at least one groove formed thereon to be able to accommodate at least one switch provided on the electronic pen connection structure.

15 Claims, 7 Drawing Sheets

ELECTRONIC PEN, ELECTRONIC PEN CONNECTION STRUCTURE CONNECTING TO THE ELECTRONIC PEN, AND PORTABLE DEVICE HAVING THE ELECTRONIC PEN CONNECTION STRUCTURE

CROSS-REFERENCE TO RELATED APPLICATION(S)

This application claims the benefit under 35 U.S.C. §119 (a) of a Korean patent application filed on Feb. 28, 2013 in the Korean Intellectual Property Office and assigned Serial No. 10-2013-0021752, the entire disclosure of which is hereby incorporated by reference.

TECHNICAL FIELD

The present disclosure relates to an electronic pen, an electronic pen connection structure connecting to the electronic pen, and a portable device having the electronic pen connection structure. More particularly, the present disclosure relates to an electronic pen that controls an on/off operation of a switch provided on an electronic pen connection structure of a portable device using at least one groove provided on the electronic pen, the electronic pen connection structure connecting to the electronic pen, and the portable device having the electronic pen connection structure.

BACKGROUND

A portable device according to the related art performs advanced functions, such as image capturing of a photograph or a moving image, reproduction of a music file or a moving image file, gaming, reception of broadcasts, wireless Internet support, and the like. In addition, the portable device may be implemented in the form of a multimedia player. Accordingly, in order to strengthen portability and convenience while satisfying user demand, hardware and/or software of the portable device according to the related art has been developed.

The electronic pen has been used as an auxiliary means for conveniently controlling various functions of the portable device. The portable device detects an input by the electronic pen and controls various kinds of functions of the portable device according to the detected input.

As the control of the portable device through an input of the electronic pen is generalized, an electronic pen connection structure for connecting the electronic pen to the portable device is provided on the portable device in order to prevent the loss of the electronic pen. Although the electronic pen connection structure for connecting the electronic pen to the portable device may be used for various purposes, at present, the electronic pen connection structure is currently only used for the loss prevention.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problem and/or disadvantages and to provide at least the advantages described below. Accordingly, an aspect of the present disclosure is to provide an electronic pen connectable to a portable device that has at least one groove formed thereon to control an on/off operation of at least one switch provided on an electronic pen connection structure of a portable device.

Another aspect of the present disclosure is to provide an electronic device that has an electronic pen connection structure having at least one switch accommodated in a groove of an electronic pen.

Another aspect of the present disclosure is to provide a portable device that is controlled according to an on/off operation of at least one switch thereof caused by a groove of an electronic pen.

In accordance with an aspect of the present disclosure, an electronic pen connected to a portable device by an electronic pen connection structure formed on the portable device is provided. The device includes a pen point portion that generates a user input on the portable device, and a penholder portion that is connected to the pen point portion and comprises at least one groove formed thereon to be able to accommodate at least one switch provided on the electronic pen connection structure.

In accordance with an aspect of the present disclosure, the at least one groove may be formed along a part of a circumference of the penholder portion.

In accordance with an aspect of the present disclosure, at least two of the at least one groove may have a different length of a circumference.

In accordance with an aspect of the present disclosure, the different length of the circumference may have a predetermined ratio.

In accordance with an aspect of the present disclosure, the penholder portion may accommodate the at least one switch through the at least one groove to control the at least one switch to be turned off, and may come in contact with the at least one switch through a circumference on which the at least one groove is not formed to control the at least one switch to be turned on.

In accordance with an aspect of the present disclosure, the penholder portion may be rotated in a state where the penholder portion is connected to the electronic pen connection structure to accommodate a part of the at least one switch in the at least one groove and to make the remaining part thereof come in contact with a circumference on which the at least one groove is not formed.

In accordance with an aspect of the present disclosure, the penholder portion may further include a dial portion that enables the electronic pen to be rotated in a state in which the electronic pen is connected to the portable device.

In accordance with an aspect of the present disclosure, the dial portion may include at least one of a jog dial, a jog shuttle, a jog wheel, and a dial.

In accordance with an aspect of the present disclosure, the dial portion may include an indicator that indicates the number of switches that are controlled to be turned off among the at least one switch and an on/off combination state according to the number of the switches that are controlled to be turned on.

In accordance with another aspect of the present disclosure, an electronic pen connection structure connected to an electronic pen is provided. The structure includes a connection portion that accommodates the electronic pen, a switch portion that includes at least one switch projecting to an inside of the connection portion, and a main board portion that is electrically connected to the at least one switch and that generates a control signal according to an on/off operation of the at least one switch.

In accordance with an aspect of the present disclosure, the at least one switch may be accommodated in at least one groove formed on the electronic pen.

In accordance with an aspect of the present disclosure, the at least one switch may be controlled to be turned off when the at least one switch is accommodated in the at least one groove corresponding to the at least one switch, and may be controlled to be turned on when the at least one switch comes in contact with a circumference on which the at least one groove is not formed.

In accordance with an aspect of the present disclosure, a part of the at least one switch may be accommodated in the at least one groove and the remaining part thereof may come in contact with the circumference on which the at least one groove is not formed by rotation of the electronic pen.

In accordance with an aspect of the present disclosure, the at least one switch may include an auxiliary switch that comes in contact with a circumference of the electronic pen to be controlled to be turned on as the electronic pen is accommodated in the connection portion.

In accordance with still another aspect of the present disclosure, a portable device that is selectively connected to an electronic pen is provided. The portable device includes a connection portion that accommodates the electronic pen therein, an electronic pen sensing portion that includes a switching portion including at least one switch that projects to an inside of the connection portion, and a control portion that performs a control operation according to an on/off operation of the at least one switch.

In accordance with an aspect of the present disclosure, the at least one switch may be controlled to be turned off when the at least one switch is accommodated in the at least one groove corresponding to the at least one switch, and may be controlled to be turned on when the at least one switch comes in contact with a circumference on which the at least one groove is not formed.

In accordance with an aspect of the present disclosure, the part of the at least one switch may be accommodated in the at least one groove and the remaining part thereof may come in contact with the circumference on which the at least one groove is not formed by rotation of the electronic pen.

In accordance with an aspect of the present disclosure, the at least one switch may include an auxiliary switch that comes in contact with a circumference of the electronic pen to be controlled to be turned on as the electronic pen is accommodated in the connection portion.

In accordance with an aspect of the present disclosure, the control portion, if the auxiliary switch is controlled to be turned off, may not perform the control operation according to an on/off state of other switches.

In accordance with another aspect of the present disclosure, a method for controlling an electronic device according to a configuration of an electronic pen which is selectively connected to the electronic device is provided. The method includes determining whether the electronic pen is connected to the electronic device, and if the electronic pen is connected to the electronic device, determining the configuration of the electronic pen in relation to the electronic device, and performing an operation associated with the determined configuration of the electronic pen.

In accordance with an aspect of the present disclosure, the electronic pen, the electronic pen connection structure connecting to the electronic pen, and the portable device having the electronic pen connection structure, various functions of the portable device can be conveniently controlled using the electronic pen connected to the electronic pen connection structure without addition of separate buttons or switches to the external structure of the portable device.

Further, in accordance with an aspect of the present disclosure, the electronic pen, the electronic pen connection structure connecting to the electronic pen, and the portable device having the electronic pen connection structure, the electronic pen, which is used only for the loss prevention, can be used for various purposes to control the portable device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure may be applied to control an electronic pen and a portable device connected to the electronic pen.

Further, the present disclosure may be applied to not only a general electronic terminal, such as a smart phone, a portable terminal, a mobile terminal, a Personal Digital Assistant (PDA), a Portable Multimedia Player (PMP), a digital camera, an MP3 player, a portable game console, a handheld e-book, a portable laptop Personal Computer (PC), a note pad, a Wibro terminal, a tablet PC, a Global Positioning System (GPS) navigation, and/or the like, but also all devices to which a pen is detachably attached.

Technical terms used in the description are used only to explain specific embodiments, but are not intended to limit the concept of the present disclosure. Further, unless specially defined, the technical terms used in the description should be used as meanings commonly understood by those ordinary skilled in the art to which the present disclosure belongs, but should not be construed as excessively comprehensive meanings or excessively reduced meanings.

Further, in the description, a singular expression may include a plural expression unless specially described. The term "comprises" and/or "includes" used in the description means that several components or operations used in the description are not necessarily included.

Hereinafter, various embodiments of the present disclosure will be described in detail with reference to the accompanying drawings.

Figure 1:
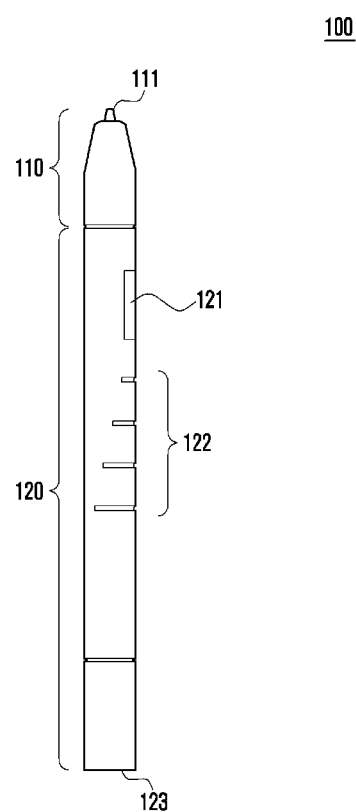
FIG. 1 is a side view of an electronic pen according to an embodiment of the present disclosure.
Figure 2:
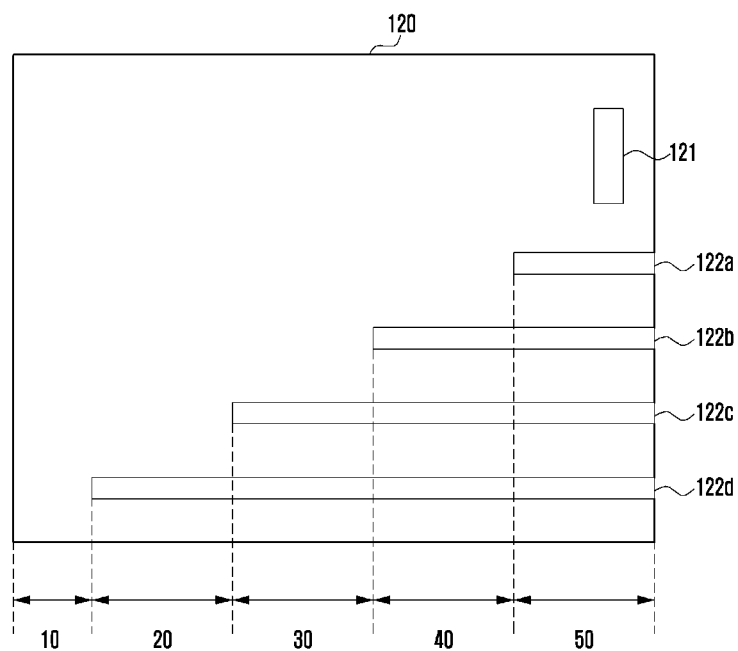
FIG. 2 is a development view of a body portion of an electronic pen according to an embodiment of the present disclosure.
Figure 3:
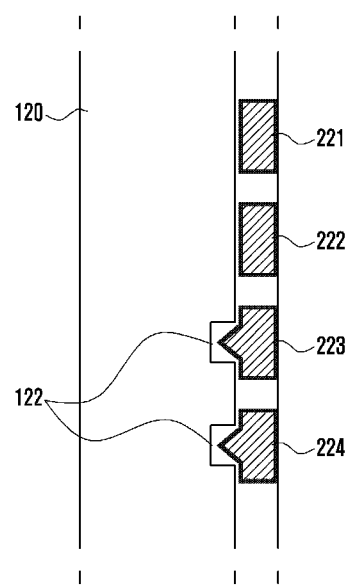
FIG. 3 is a view illustrating an example of an electronic pen connected to an electronic pen connection structure according to an embodiment of the present disclosure.
Figure 4:
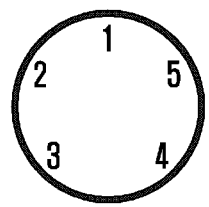
FIG. 4 is a bottom view of an electronic pen according to an embodiment of the present disclosure.
Figure 5:
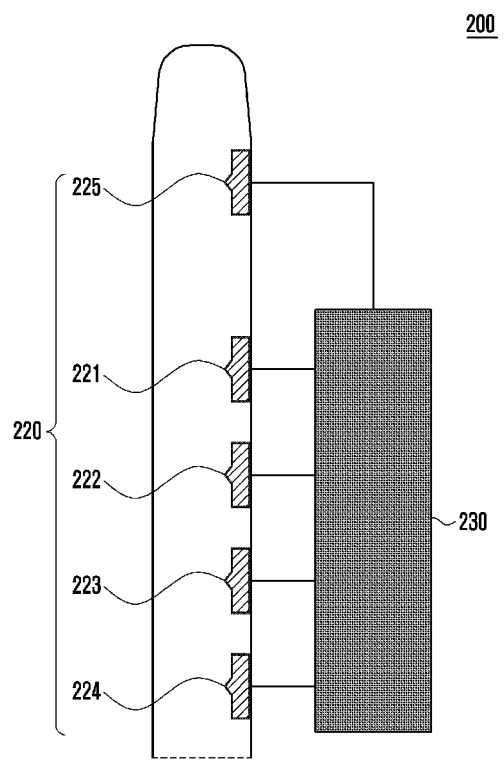
FIG. 5 is a cross-sectional view of an electronic pen connection structure according to an embodiment of the present disclosure.

FIG. 1 is a side view of an electronic pen according to an embodiment of the present disclosure. FIG. 2 is a development view of a body portion of an electronic pen according to an embodiment of the present disclosure. FIG. 3 is a view illustrating an example of an electronic pen connected to an electronic pen connection structure according to an embodiment of the present disclosure. FIG. 4 is a bottom view of an electronic pen according to an embodiment of the present disclosure. FIG. 5 is a cross-sectional view of an electronic pen connection structure according to an embodiment of the present disclosure.

Referring to FIG. 1, the electronic pen 100 includes a pen point portion 110 and a penholder portion 120.

According to various embodiments of the present disclosure, the electronic pen 100 may be implemented as a capacitive type or an electrostatic type so that the electronic pen 100 generates an input through a touch screen using a change of a magnetic field. According to various embodiments of the present disclosure, the electronic pen 100 is configured to be connected to an electronic pen connection structure such as the electronic pen connection structure 200 illustrated in FIG. 5.

At least one circuit for generating an electric field or a magnetic field may be provided inside the pen point portion 110. At least one of resistance, capacitance and/or inductance may be included in the circuit so as to change the intensity or the frequency of the electromagnetic field in accordance with an operation state of the electronic pen 110.

A pen point 111 is formed at one end of the pen point portion 110. The pen point 111 may be made of a conductive material to change the electric field or the magnetic field formed in the vicinity of the pen point 111. Further, the pen point 111 may be configured to discharge the electromagnetic field that is generated from the circuit provided inside the pen point portion 110 to an external environment. The pen point 111 comes in contact with an electronic device 300 and enables an electronic device such as the electronic device 300 illustrated in FIG. 6 to detect a user input in accordance with the change of the electromagnetic field.

The penholder portion 120 is connected to the other end of the pen point portion 110.

A button 121 for changing the frequency or the strength of the electromagnetic field that is generated by the electronic pen 100 may be provided on the penholder portion 120. The button 121 is coupled to the resistance, capacitance, and/or inductance of the internal circuit, and changes the attribute of the electromagnetic field in accordance with the operation state of the button 121.

Referring to FIGS. 1, 3, and 5, at least one groove 122 is formed on the penholder portion 120. The at least one groove 122 may accommodate at least one of switches 221, 222, 223, 224, and 225 provided on the electronic pen connection structure 200.

The at least one groove 122 may be formed along a part of a circumference of the penholder portion 120. Further, the at least one groove 122 may be formed along parts of different circumferences of the penholder portion 120.

Referring to FIG. 2, the at least one of grooves 122a, 122b, 122c, and 122d may be formed on the penholder portion 120. The respective grooves are named a first groove 122a, a second groove 122b, a third groove 122c, and a fourth groove 122d. As illustrated in FIG. 2, the at least one groove 122 may be formed along parts of different circumferences of the penholder portion 120.

As illustrated in FIG. 2, the at least one groove 122 may have lengths of different circumferences. In this case, the lengths of the circumferences of the grooves 122 may have a predetermined ratio. For example, the lengths of the circumferences of the grooves 122 may have the ratio of 1:2:3:4. The length of the longest circumference (e.g., the length of the circumference of the fourth groove 122d illustrated in FIG. 2), may be shorter than the length of the whole circumference of the penholder portion 120.

The penholder portion 120 controls the on/off operation of the at least one of switches 221, 222, 223, 224, and 225 provided on the electronic pen connection structure 200 using the at least one groove 122.

Referring to FIG. 3, the penholder portion 120 accommodates a button of the switch through the at least one groove 122, and thus prevents the switch button from being pushed to keep the switch turned off. Further, the penholder portion 120 comes in contact with the switch button through the circumference on which the at least one groove 122 is not formed, and thus pushes the switch button to keep the switch turned on.

The at least one groove 122 may be formed to correspond to the at least one of switches 221, 222, 223, 224, and 225 in order to control the on/off operation of the at least one of switches 221, 222, 223, 224, and 225. Specifically, as illustrated in FIG. 3, the at least one groove 122, may be formed in a position corresponding to the at least one of switches 221, 222, 223, 224, and 225.

In this case, the at least one of switches 221, 222, 223, 224, and 225 may have various on/off combinations through the at least one groove 122 formed with the lengths of different circumferences. Specifically, the at least one of switches 221, 222, 223, 224, and 225 may be controlled so that the number of switches that are controlled to be turned on and the number of switches that are controlled to be turned off are different from each other through the at least one groove 122 formed with the lengths of the different circumferences.

Referring to FIG. 2, a first region 10 indicates a region at which the at least one groove 122 is not formed. In the first region 10, the at least one of switches 221, 222, 223, 224, and 225 is not accommodated in the at least one groove 122, but comes in contact with the circumference on which the at least one groove 122 is not formed to be controlled to be turned on.

A second region 20 indicates a region at which only the fourth groove 122d is formed. In the second region 20, only one switch corresponding to the fourth groove 122d among the at least one of switches 221, 222, 223, 224, and 225 is accommodated in the fourth groove 122d to be controlled to be turned off, and the remaining switches come in contact with the circumference on which the at least one groove 122 is not formed to be controlled to be turned on.

A third region 30 indicates a region at which the third groove 122c and the fourth groove 122d are formed. In the third region 30, only two switches corresponding to the third groove 122c and the fourth groove 122d among the at least one of switches 221, 222, 223, 224, and 225 are respectively accommodated in the third groove 122c and the fourth groove 122d to be controlled to be turned off, and the remaining switches come in contact with the circumference on which the at least one groove 122 is not formed to be controlled to be turned on.

A fourth region 40 indicates a region at which the second groove 122b, the third groove 122c, and the fourth groove 122d are formed. In the fourth region 40, only three switches corresponding to the second groove 122b, the third groove 122c, and the fourth groove 122d among the at least one of switches 221, 222, 223, 224, and 225 are respectively accommodated in the second groove 122b, the third groove 122c, and the fourth groove 122d to be controlled to be turned off, and the remaining switches are controlled to be turned on.

A fifth region 50 indicates a region at which the first groove 122a, the second groove 122b, the third groove 122c, and the fourth groove 122d are all formed. In the fifth region 50, switches corresponding to the first groove 122a, the second groove 122b, the third groove 122c, and the fourth groove 122d are accommodated to be controlled to be turned off The electronic pen 100 may be rotated in a state in which the electronic pen 100 is connected to the electronic pen connection structure 200. If at least one of switches 221, 222, 223, 224, and 225 is fixed to a certain position in the electronic pen connection structure 200, the at least one of switches 221, 222, 223, 224, and 225 may be controlled as an on/off combination according to any one of the first region 10 to the fifth region 50 by rotation of the electronic pen connection structure 200.

According to various embodiments of the present disclosure, the at least one of switches 221, 222, 223, 224, and 225 may include the auxiliary switch 225 that does not correspond to the at least one groove 122. In this case, in spite of the rotation of the electronic pen 100, the auxiliary switch 255 is not accommodated in the at least one groove 122. Accordingly, while the electronic pen 100 is connected to the electronic pen connection structure 200, the auxiliary switch 225 may be controlled to be always turned on. As a result, the electronic pen connection structure 200 may determine whether the electronic pen 100 is connected to the electronic pen connection structure 200 through the auxiliary switch 225, and in a state in which the auxiliary switch 225 is not controlled to be turned on, the control operation according to various embodiments of the present disclosure may not be performed even though any one of the switches 221, 222, 223, 224, and 225 is controlled to be turned on.

In the above-described embodiment of the present disclosure, on/off combinations of the at least one of switches 221, 222, 223, 224, and 225 in the respective regions may be presented as in Table 1 below.

TABLE 1

| | First Switch | Second Switch | Third Switch | Fourth Switch | Fifth Switch |
|---|---|---|---|---|---|
| First Region | ON | ON | ON | ON | ON |
| Second Region | ON | ON | ON | OFF | ON |
| Third Region | ON | ON | OFF | OFF | ON |
| Fourth Region | ON | OFF | OFF | OFF | ON |
| Fifth Region | OFF | OFF | OFF | OFF | ON |

According to various embodiments of the present disclosure, a dial portion 123 may be formed at one end of the penholder portion 120. The dial portion 123 helps the rotation of the electronic pen 100 in a state where the electronic pen 100 is connected to the electronic pen connection structure 200. As an example, a dial portion 123 may include a jog dial, a jog shuttle, a jog wheel, or a scroll. A groove or a projection portion may be formed on the dial portion 123 so that the rotating dial portion 123 can be fixed at a specific rotating angle.

Referring to FIG. 4, the dial portion 123 may include an indicator that indicates an on/off combination of the at least one of switches 221, 222, 223, 224, and 225 by means of the at least one groove 122.

For example, indicator 1 in FIG. 4 may indicate the first region 10 at which the at least one groove 122 is not formed in FIG. 2 and all switches are controlled to be turned on. Indicator 2 in FIG. 4 may indicate the second region 20 at which only the fourth groove 122d is formed and only the switch corresponding to the fourth groove 122d is controlled to be turned off Indicator 3 in FIG. 4 may indicate the third region 30 at which the third groove 122c and the fourth groove 122d are formed and only the switches corresponding to the third groove 122c and the fourth groove 122d are controlled to be turned off Similarly, indicator 4 may indicate the fourth region 40 at which the second groove 122b, the third groove 122c, and the fourth groove 122d are formed. Indicator 5 may indicate the fifth region 50 at which the first groove 122a, the second groove 122b, the third groove 122c, and the fourth groove 122d are all formed.

The indicator may function to guide a user to rotate the electronic pen 100 in a desired on/off combination state through the indicator.

As illustrated in FIG. 4, the indicator is configured as numerals. However, various embodiments of the present disclosure are not limited thereto. For example, according to various embodiments of the present disclosure, the indicator may be configured as a text, a picture, an icon, and/or the like.

According to various embodiments of the present disclosure, the constituent elements illustrated in FIG. 1 are not essential, and the electronic pen 100 having more or less constituent elements than the constituent elements illustrated in FIG. 1 may be implemented.

Referring to FIG. 5, the electronic pen connection structure 200 may include a connection portion 210, a switch portion 220, and a main board portion 230.

The connection portion 210 is formed to accommodate the electronic pen 110. One end or both ends of the connection portion 210 may be formed to be open so that the electronic pen 110 can be inserted therein. FIG. 5 illustrates an example in which a lower end of the connection portion 210 is open so that the electronic pen 110 is inserted through the lower end thereof FIG. 5 illustrates an example that side surfaces of the connection portion 210 are configured to be closed in all directions. However, implementing the connection portion 210 so that a certain side surface of the connection portion 210 is open and the electronic pen 110 is inserted through the open side surface is also possible.

The switch portion 220 may include at least one of switches 221, 222, 223, 224, and 225. According to various embodiments of the present disclosure, at least one of switches 221, 222, 223, 224, and 225 may include a tact switch. The tact switch has a button, and if the button is pushed, the tact switch is controlled to be in an on state, while if the bottom is not pushed, the tact switch is controlled to be in an off state.

The button of the tact switch may project inside the connection portion 120. The projecting button may come in contact with the electronic pen 100 connected to the connection portion 120 to be controlled to be turned on. Further, the projecting button may be accommodated in at least one groove 122 formed on the electronic pen 100 to be controlled to be turned off.

Specifically, referring to FIG. 3, the button of the tact switch may be accommodated in the groove 122 of the electronic pen 100 connected through the connection portion 210. In this case, if the button of the tack switch is accommodated in the groove 122 of the electronic pen 100, the button is not pressed, and the tact switch is controlled to be in an off state. In contrast, if the button of the tact switch is not accommodated in the groove 122 of the electronic pen 100. For example, if the tact switch comes in contact with the body portion on which the groove 122 is not formed, the button of the tact switch is pushed, and the tact switch is controlled to be in an on state.

According to various embodiments of the present disclosure, a part of the at least one of switches 221, 222, 223, 224, 225 may be controlled to be turned on, and the remaining part thereof may be controlled to be turned off Among the at least one of switches 221, 222, 223, 224, and 225, the number of the switches that are controlled to be turned on and the number of switches that are controlled to be turned off may be adjusted through the rotation of the electronic pen 100. An example of the on/off combination according to the number of on/off switches is as described above.

According to various embodiments of the present disclosure, the at least one of switches 221, 222, 223, 224, and 225 may include the auxiliary switch 225 that comes in contact with the circumference of the electronic pen 100 to be controlled to be turned on as the electronic pen 100 is accommodated in the connection portion 210. In this case, in spite of the rotation of the electronic pen 100, the auxiliary switch 255 is not accommodated in the at least one groove 122. Accordingly, while the electronic pen 100 is connected to the electronic pen connection structure 200, the auxiliary switch 225 may be controlled to be always turned on. As a result, the electronic pen connection structure 200 may determine whether the electronic pen 100 is connected to the electronic pen connection structure 200 through the auxiliary switch 225, and in a state in which the auxiliary switch 225 is not controlled to be turned on, the control operation according to the present disclosure may not be performed even though any one of the switches 221, 222, 223, 224, and 225 is controlled to be turned on.

The at least one of switches 221, 222, 223, 224, and 225, which constitute the switch portion 220 may be electrically connected to the main board portion 230. The main board portion 230 generates a control signal according to the on/off operation of the at least one of switches 221, 222, 223, 224, and 225. The main board portion 230 may generate the control signal according to the on/off state of the at least one of switches 221, 222, 223, 224, and 225 and transmit the generated control signal to an external environment.

According to various embodiments of the present disclosure, the constituent elements illustrated in FIG. 5 are not essential, and the electronic pen connection structure 200 having more or less constituent elements than the constituent elements illustrated in FIG. 5 may be implemented.

Figure 6:
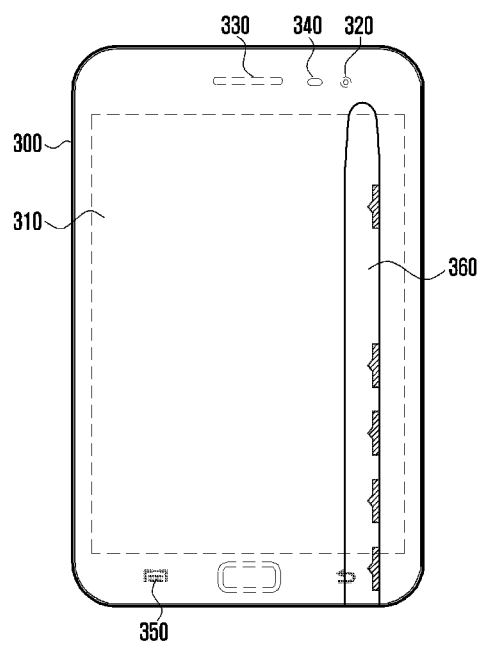
FIG. 6 is a view illustrating an electronic device having an electronic pen connection structure according to an embodiment of the present disclosure.

FIG. 6 is a view illustrating an electronic device having an electronic pen connection structure according to an embodiment of the present disclosure.

Referring to FIG. 6, a display unit 310 may be arranged on the front surface of the electronic device 300. Further, a camera 320, a sound output unit 330, a voice input unit 340, and a home button 350 may be arranged on the front surface of the electronic device 300.

The display unit 310 may be implemented as a touch screen that can detect an input according to the capacitive type or electrostatic type electronic pen 100. In this case, the display unit 310 may perform functions of an input device. The display unit 310 implemented as the touch screen may detect an access or contact of the electronic pen 100 through the change of the electric field or the magnetic field. The electronic pen 100 that generates the input through the display unit 230 may be equal to the electronic pen 100 as described above with reference to FIGS. 1 to 3.

The camera 320 may be implemented to perform image capturing of a photograph or a moving image.

The sound output unit 330 may be implemented in the form of a receiver or a speaker.

The voice input unit 340 may be implemented to receive an input of user's voice or sound.

The home button 350 may be implemented as a dome switch or a touchpad that can receive an input of a command or information according to a user's push or touch operation, or may be implemented as a wheel for rotating a key, a jog method, a jog stick, or the like. In function, the home button 350 may operate as a hot key for inputting a command, such as a start, a stop, and a scroll, or for activating a special function in the portable device 300.

According to various embodiments of the present disclosure, the electronic device 300 may include the electronic pen connection structure 360 that can be connected to the electronic pen 100. The electronic pen connection structure 360 may include a connection portion to which the electronic pen 100 is connected, and at least one switch that projects to the inside of the connection portion. The at least one switch may be accommodated in the at least one hole provided on the electronic pen 100 connected through the connection portion. If the at least one switch is accommodated in the hole, the at least one switch may be controlled to be in an off state, while if the switch is not accommodated in the hole. For example, if the switch comes in contact with the circumference rather than the hole of the electronic pen 100, the switch may be controlled to be in an on state. The electronic device 300 is designed to control various functions provided by the electronic device 300 in accordance with the on/off operation state of at least one button.

According to various embodiments of the present disclosure, the electronic pen connection structure 360 provided on the electronic device 300 may be the same as the electronic pen connection structure 360 as described above with reference to FIGS. 4 and 5.

Figure 7:
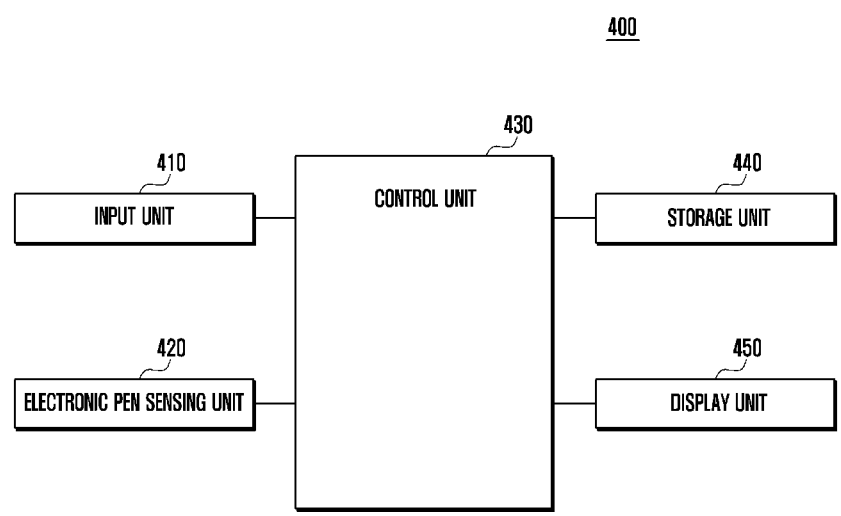
FIG. 7 is a block diagram illustrating a configuration of an electronic device having an electronic pen connection structure according to an embodiment of the present disclosure.

FIG. 7 is a block diagram illustrating a configuration of an electronic device having an electronic pen connection structure according to an embodiment of the present disclosure.

Referring to FIG. 7, the electronic device 400 may include an input unit 410, an electronic pen sensing unit 420, a control unit 430, a storage unit 440, and a display unit 450.

The input unit 410 detects a user's input, and transmits an input signal corresponding to the user's input to the control unit 430. The input unit 410 may include a keypad, a dome switch, a touchpad (e.g., static voltage/static current), a jog wheel, a jog switch, a finger mouse, a wheel, and/or the like.

The input unit 410 may be configured to include a touch sensor, a proximity sensor, an electromagnetic sensor, a pressure sensor, and/or the like. The input unit 410 may detect a user's touch input or proximity input through the sensors. The input unit 410 may be configured as an input pad in which sensors are attached to the pad in a film shape or sensors are combined in a panel shape. For example, the input unit 410 may be configured as an Electro Magnetic Resonance (EMR) type, Electro Magnetic Interference (EMI) type, or the like, input pad using an electromagnetic sensor.

The input unit 410 may have a layer structure together with the display unit 450 to be described later and operate as an input screen. For example, the input unit 410 may include an input pad having a touch sensor, and may be configured as a Touch Screen Panel (TSP) connected to the display unit 450. The input unit 410 that forms the layer structure with the display unit 450 may be named a touch screen.

The electronic pen sensing unit 420 may include a connection portion for accommodating the electronic pen 100 and at least one switch that projects to the inside of the connection portion. The at least one switch may come in contact with the circumference of the electronic pen 100 to be controlled to be turned on as the electronic pen 100 is accommodated in the connection portion. The electronic pen sensing unit 420 may detect that the electronic pen 100 is connected thereto as the auxiliary switch is controlled to be turned on.

Further, the electronic pen sensing unit 420 may detect that a part of the at least one switch is accommodated in the at least one groove formed on the electronic pen 100 to be controlled to be turned off. Further, the electronic pen sensing unit 420 may detect that a part of the at least one switch comes in contact with the circumference of the electronic pen 100, on which the at least one groove is not formed, to be controlled to be turned on. The electronic pen sensing unit 420 may generate an on/off control signal for the at least one switch and transmit the generated control signal to the control unit 430.

The control unit 430 may control the portable device 400 to perform various functions of the portable device 400 in accordance with the on/off state of the at least one switch through analysis of the control signal received from the electronic pen sensing unit 420. At this time, if the control signal of the state in which the auxiliary switch is not controlled to be turned on is received from the electronic pen sensing unit 420, the control unit 430 may disregard the control signals according to the on/off states of the remaining switches.

The control unit 430 may control the respective constituent elements for the whole operation of the portable device 400. According to an embodiment of the present disclosure, the control unit 430 may control the portable device 400 to perform various functions according to the switch control state through the electronic pen 100 that is detected through the electronic pen sensing unit 420.

Hereinafter, the operation of the control unit 430 will be described in more detail with reference to the drawings.

The storage unit 440 may store programs or command for the portable device 400. The control unit 430 may perform the programs or commands stored in the storage unit 440.

The storage unit 440 may include at least one type storage medium selected from the group including a flash memory type, a hard disk type, a multimedia card micro type, and a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disk.

According to various embodiments of the present disclosure, the storage unit 440 may store information related to the operation corresponding to the on/off combination of the at least one switch provided in the electronic pen sensing unit 420.

The display unit 450 displays (outputs) information that is processed by the portable device 400. For example, the display unit 450 may display information corresponding to the program or service that is currently driven together with a User Interface (UI) or a Graphic User Interface (GUI).

The display unit 450 may operate as a touch screen that forms a mutual layer structure with the input unit 410 and the sensor unit 120. At this time, the display unit 450 that operates as the touch screen may perform the function of the input device.

According to various embodiments of the present disclosure, the constituent elements illustrated in FIG. 7 are not essential, and the portable device 400 having more or less constituent elements than the constituent elements illustrated in FIG. 7 may be implemented.

Figure 8:
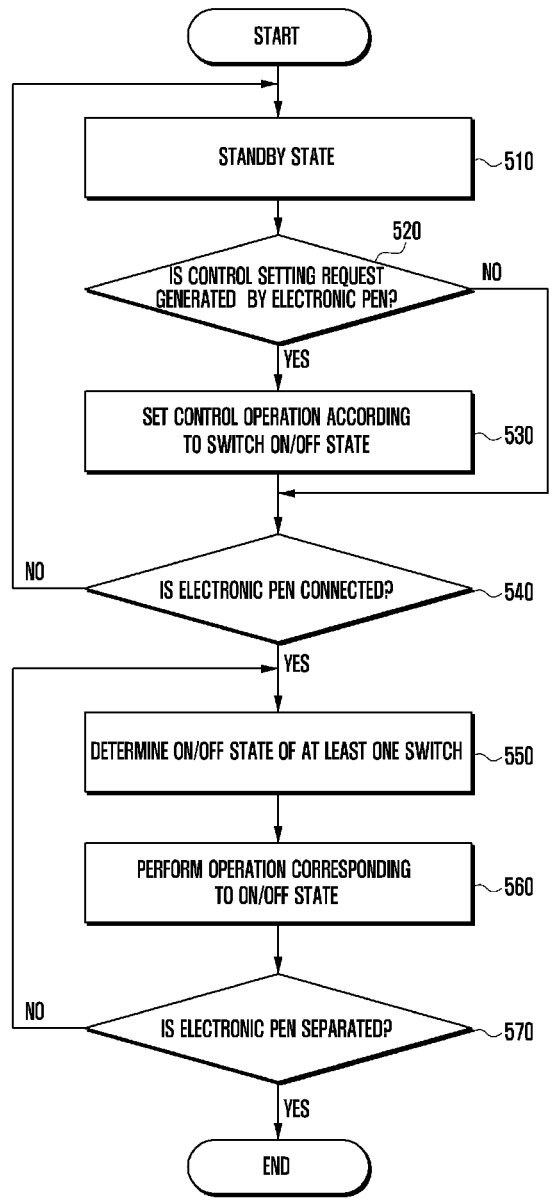
FIG. 8 is a flowchart illustrating a method for controlling an electronic device according to an embodiment of the present disclosure.

FIG. 8 is a flowchart illustrating a method for controlling an electronic device according to the present disclosure.

Referring to FIG. 8, at operation 510, the control unit 430 may operate in a standby state.

In a standby state, the control unit 430 may operate in a locking mode, a standby mode, a sleep mode, or the like, or may drive a certain application, program or service. The control unit 430 may control the display unit 450 to display a locking screen in the standby state, a standby screen, or the like, or a screen corresponding to the application being driven.

At operation 520, the control unit 430 may determine whether a control setting request for the portable device 400 is generated by the electronic pen 100.

In accordance with the input detected through the input unit 410, the control unit 430 may determine whether the control setting request is generated by the electronic pen 100. The setting request may be generated through selection of a setting menu or an interface such as an icon. Further, the setting request may be generated by a quick button or a reset button provided on the portable device 400.

If the control unit 430 determines that the control operation setting request is not generated at operation 520, then the control unit 430 may proceed to operation 540.

In contrast, if the control unit 430 determines that the control operation setting request is generated at operation 520, then the control unit 430 proceeds to operation 530 at which the control unit 430 sets a control operation according to the on/off state of the at least one switch. Thereafter, the control unit 430 proceeds to operation 540.

The control unit 430 may enter into the setting mode in response to the setting request. As entering into the setting mode, the control unit 430 may control the display unit 450 to display a user interface for setting.

For example, the control unit 430 may control the display unit 450 to display a list for the on/off combination of at least one button and a list of control operations that can be set with respect to the respective on/off combinations. For example, on/off combination with respect to at least one button is as described above with reference to Table 1.

The list of control operations may be generated according to a function, an application, a program, or a service provided from the portable device 400. Further, the list of the operations may be generated based on the mode, function, or service provided from a specific application. In this case, the controller 430 may individually set the control operation with respect to two or more applications provided from the portable device 400.

In one embodiment, a default value of the control operation may be provided. The default value may be predetermined and stored in the storage unit 440 when the portable device 400 is manufactured. According to various embodiments of the present disclosure, if the control operation setting request is generated by a reset button, the control unit 430 may set the control operation with the default value.

In addition, the control unit 430 may set the on/off mode of the control operation by the electronic pen 200 according to the present disclosure. The control unit 430 may control the display unit 450 to display a user interface for setting the on/off mode. At this time, the user interface for setting the on/off mode may be displayed on a menu screen, a standby screen, or an upper end curtain GUI on the display unit 450.

At operation 540, the control unit 430 determines whether the electronic pen 200 is connected thereto.

The control unit 430 determines whether the electronic pen 100 is connected thereto based on whether the auxiliary switch is controlled to be turned on. The auxiliary switch may be controlled to be turned on when the electronic pen 100 is connected to the connection portion of the electronic pen sensing unit 420 and the auxiliary switch comes in contact with the circumference of the electronic pen 100.

According to various embodiments of the present disclosure, if there is a control operation corresponding to the connection sensing of the electronic pen 100, the control unit 430 may perform the corresponding control operation. For example, the control unit 430 may drive a call function according to the connection of the electronic pen 100. For example, if a user inputs a phone number of an opposite party to which a user intends to make a call using the electronic pen 100 and connects the electronic pen 100 to the portable device 400, the control unit 430 may drive the call function to request a call from the opposite party using the input phone number.

If the control unit 430 determines that the electronic pen 100 is not connected at operation 540, then the control unit 430 proceeds to operation 510 at which the control unit 430 may return to the standby state and repeat the operation according to various embodiments of the present disclosure.

If the control unit 430 determines that the electronic pen 100 is connected at operation 540, then the control unit 430 proceeds to operation 550 at which the control unit 430 determines the on/off operation of the at least one switch.

The control unit 430 determines whether the at least one switch is accommodated in the groove of the electronic pen 100 to be controlled to be turned off or comes in contact with the circumference on which the groove is not formed to be controlled to be turned on. The number of switches that are turned on/off may be adjusted according to the rotation of the electronic pen 100.

At operation 560, the control unit 430 performs the control operation according to the on/off state.

The control operation may be set by the user according to the above-described process, or may be preset during the manufacturing of the portable device 400 and may be stored in the storage unit 440.

According to various embodiments of the present disclosure, the control unit 430 may drive an application corresponding to the on/off state of the at least one switch. Further, the control unit 430 may perform a specific function or set the operation mode of the application with respect to the application that is currently being driven or that can be driven.

For example, the control unit 430 may perform functions of file attachment, addition of an emoticon, or message transmission according to the on/off state of the at least one switch. Further, the control unit 430 may perform functions of sound mute, speaker phone, or video call according to the on/off state of the at least one switch during driving of the call application. The controller 430 may perform functions of moving image mode change, filter application, auto focusing, or timer setting according to the on/off state of the at least one switch during driving of a camera application. Further, the control unit 430 may perform mode change between a general calculator and an engineering calculator according to the on/off state of the at least one switch during driving of the calculator application.

According to various embodiment of the present disclosure, if the on/off state of the at least one switch is successively changed according to the rotation of the electronic pen 100, the controller 430 may perform the control operation based on the successive change. For example, the control unit 430 may determine the rotating direction of the electronic pen 100 based on the successive change of the on/off state of the at least one switch. Further, the control unit 430 may perform the control operation corresponding to the rotating direction.

For example, during the driving of a web browser application, the control unit 430 may control the scroll of the web browser according to the rotating direction. Further, during the driving of the camera application, the control unit 430 may control a zoom-in/zoom-out function of the camera according to the rotating direction. Similarly, during the driving of a document or image viewer application, the control unit 430 may control expansion/reduction of the displayed screen according to the rotating direction.

During the driving of a content reproduction application, for example, music reproduction, moving image reproduction, or broadcast reproduction application, the control unit 430 may perform volume control, selection of a reproduced film, fast forward/rewind control, reproduction speed control, or the like according to the rotating direction or the magnetic field level after the rotation.

At operation 570, the control unit 430 may determine whether the electronic pen 100 is separated. For example, the control unit 430 may determine whether the electronic pen 100 is detached from the portable device 400.

If all switches are controlled to be turned off through the electronic pen sensing unit 420, the control unit 430 may determine that the electronic pen 100 is separated and terminate the operation according to various embodiments of the present disclosure. If an operation corresponding to the separation of the electronic pen 100 is set, the control unit 430 may perform the corresponding operation. For example, the control unit 430 may perform an operation related to a quick memory function or entrance of an image or picture edition mode.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic pen connected to a portable device by an electronic pen connection structure formed on the portable device, the electronic pen comprising:
    a pen point portion; and
    a penholder portion that is connected to the pen point portion and comprises at least two grooves formed thereon to be able to each accommodate one switch provided on the electronic pen connection structure,
    wherein the at least two grooves are formed along a part of a circumference of the penholder portion and the at least two grooves each have a different length,
    wherein the penholder portion is rotated in a state where the penholder is connected to the electronic pen connection structure to accommodate one switch in the at least two grooves and to make the remaining switch comes in contact with a circumference on which the at least two grooves are not formed.

2. The electronic pen of claim 1, wherein the different length has a predetermined ratio.

3. The electronic pen of claim 1, wherein the penholder portion accommodates one switch through the at least two grooves to control the one switch to be turned off, and comes in contact with the one switch through a circumference on which the at least two grooves are not formed to control the at least one switch to be turned on.

4. The electronic pen of claim 1, wherein the penholder portion further comprises a dial portion that enables the electronic pen to be rotated in a state in which the electronic pen is connected to the portable device.

5. The electronic pen of claim 4, wherein the dial portion comprises at least one of a jog dial, a jog shuttle, a jog wheel, and a dial.

6. The electronic pen of claim 4, wherein the dial portion comprises an indicator that indicates the number of switches that are controlled to be turned off among the at least one switch and an on/off combination state according to the number of the switches that are controlled to be turned on.

7. An electronic pen connection structure that is selectively connected to an electronic pen, the electronic pen connection structure comprising:
    a connection portion that accommodates the electronic pen;
    a switch portion that includes at least one switch projecting to an inside of the connection portion; and
    a main board portion that is electrically connected to the at least one switch and that generates a control signal according to an on/off operation of the at least one switch,
    wherein the one switch is accommodated in at least two grooves formed with a different length on the electronic pen, and
    wherein the one switch is accommodated in the at least two grooves and the remaining switch comes in contact with the circumference on which the at least two grooves are not formed by rotation of the electronic pen.

8. The electronic pen connection structure of claim 7, wherein the at least one switch is controlled to be turned off when the one switch is accommodated in the at least two grooves corresponding to the at least one switch, and is controlled to be turned on when the one switch comes in contact with a circumference on which the at least two grooves are not formed.

9. The electronic pen connection structure of claim 7, wherein the at least one switch comprises an auxiliary switch that comes in contact with a circumference of the electronic pen to be controlled to be turned on as the electronic pen is accommodated in the connection portion.

10. A portable device that is selectively connected to an electronic pen, the portable device comprising:
    a connection portion that accommodates the electronic pen therein;
    an electronic pen sensing portion that includes a switching portion including at least one switch that projects to an inside of the connection portion; and
    a control portion that determines an on/off operation of the at least one switch according to whether the one switch is accommodated in the at least two grooves formed with a different length corresponding to the at least one switch and performs a control operation according to an on/off operation of the at least one switch,
    wherein the one switch is accommodated in the at least two grooves and the remaining switch comes in contact with the circumference on which the at least two grooves are not formed by rotation of the electronic pen.

11. The portable device of claim 10, wherein the at least one switch is controlled to be turned off when the one switch is accommodated in the at least two grooves corresponding to the at least one switch, and is controlled to be turned on when the one switch comes in contact with a circumference on which the at least two grooves are not formed.

12. The portable device of claim 10, wherein the at least one switch comprises an auxiliary switch that comes in contact with a circumference of the electronic pen to be controlled to be turned on as the electronic pen is accommodated in the connection portion.

13. The portable device of claim 12, wherein if the auxiliary switch is controlled to be turned off, the control portion does not perform the control operation according to an on/off state of other switches.

14. A method for controlling an electronic device according to a configuration of an electronic pen which is selectively connected to the electronic device, the method comprising:
    determining whether the electronic pen is connected to the electronic device;

if the electronic pen is connected to the electronic device, determining an on/off operation of at least one switch;

if one switch is accommodated in the at least two grooves formed with a different length, determining the configuration of the electronic pen in relation to the electronic device, and performing an operation associated with the determined configuration of the electronic pen, wherein the one switch is accommodated in the at least two grooves and the remaining switch comes in contact with the circumference on which the at least two grooves are not formed by rotation of the electronic pen.

15. A non-transitory computer-readable storage medium that stores instructions which, when executed, cause at least one processor to perform the method of claim 14.

* * * * *